3,679,636
FORMATION OF AROMATIC POLYAMIDES IN GAMMABUTYROLACTONE AS MUTUAL SOLVENT FOR AROMATIC DIAMINES, AND 2,6-LUTIDINE

Elliot A. Vogelfanger, Edison, N.J., assignor to Celanese Corporation, New York, N.Y.
No Drawing. Filed Sept. 26, 1969, Ser. No. 861,491
Int. Cl. C08g 20/20
U.S. Cl. 260—78 R          7 Claims

ABSTRACT OF THE DISCLOSURE

Aromatic diamines and aromatic diacid halides are reacted to form high-molecular weight polyamides in a mutual solvent system comprising anhydrous gamma-butyrolactone and at least one amine acid acceptor, e.g., 2,6-lutidine.

BACKGROUND OF THE INVENTION

Field of the invention

This invention relates to polyamides and particularly relates to an improved solution method of forming polyamides at low temperature from aromatic diacid halides and aromatic diamines which are in mutual solution with an amine acid acceptor and a specific solvent.

Description of the prior art

Aromatic polyamides composed entirely of alternating phenyl and carbonamide groups have excellent thermal stability and resistance to severe environmental conditions. Some reported aromatic polyamides are clear and water-white.

U.S. Pat. No. 3,006,899 discloses a combination of an aqueous solution for the aromatic diamine and a cyclic non-aromatic oxygenated organic solvent for the aromatic diacid halides. Low temperature polymerization in dimethyl acetamide are disclosed in U.S. Pat. No. 3,240,760. This solvent and others, such as chloroform and N-methyl pyrrolidone, are also described in U.S. Pat. No. 3,063,966 for a process using an organic tertiary amine as the acid acceptor.

None of the prior art researchers have discovered the unusual advantages of using a mutual solvent for the aromatic diacid halides, the aromatic diamines, the amine acid acceptor, and the amine acid hydrochloride.

SUMMARY OF THE INVENTION

It is accordingly the object of this invention to provide a process for making aromatic polyamides by reacting aromatic diacid halides and aromatic diamines in a mutual solvent which also dissolves an aromatic acid acceptor and its hydrochloride salt.

DESCRIPTION OF THE INVENTION

In satisfaction of this object and in accordance with this invention, it has been discovered that gamma-butyrolactone, in conjunction with amine acid acceptors with active hydrogen, functions as a most effective solvent for preparing high molecular weight aromatic polyamides. By conducting the polymerization at temperatures ranging from —30° C. to +30° C. with 2,6-lutidine as the specific amine acid acceptor, aromatic polyamides can be obtained, by polymerizations in gamma-butyrolactone as the mutual solvent, which have inherent viscosities as high as 3.9 dl./g., as measured in 95% $H_2SO_4$ at 25° C. and 0.5 weight percent polymer.

The process of this invention is suitable for polymerizing such aromatic diamines as 4,4'-diamino-diphenyl-sulfone, 4,4'-oxydianiline, 4,4'-diphenyldiamine, and the corresponding 3,3' derivatives. Aromatic diacid chlorides which can be polymerized according to the process of his invention include: 4,4'-sulfonyldibenzoyl chloride, 4,4'-oxydibenzoyl chloride, 4,4'-dibenzoyl chloride and the corresponding 3,3' derivatives.

Furthermore, any mixture of isophthaloyl chloride, terephthaloyl chloride, meta-phenylene diamine and para-phenylene diamine may be used according to this invention.

In addition to 2,6-lutidine (2,6-dimethyl pyridine), other nitrogen-based acid aceptors can be employed in the polymerizations of this invention provided that the pKa of the protonated base be at least 0.5 unit and preferably more than 1 unit greater than the pKa of the aromatic diamine monomers. Suitable examples comprise triethylamine, pyridine, and 2,4,6-collidine (2,4,6-trimethyl pyridine).

It has surprisingly been discovered that higher molecular weights of polyamides are obtainable if the acid acceptors which are used are soluble, both in the amine form and in the hydrochloride salt form, in gamma-butyrolactone. The miscibility of the amine acid acceptor with the solvent allows the former to trap hydrochloric acid generated during a polymerization as rapidly as it is formed. The presence in solution of the acid acceptor hydrochloride salt (e.g., lutidinium hydrochloride) has the effect of solubilizing the aromatic polyamide in the same manner as does added lithium chloride or calcium chloride in dimethyl formamide or dimethyl acetamide and thus allows polymerization to be prolonged.

The polyamide obtained in accordance with the novel process of this invention can be cast into films by techniques well known in the art from suitable known solvents for producing the films including dimethyl acetamide and dimethyl formamide.

It has been found that the properties of the resultant films can be improved by heating them to elevated temperatures for prolonged periods of time, i.e., two days, at about 220° C. Improved properties can also be obtained by extracting the films cast from dimethyl formamide or dimethyl acetamide with gamma-butyrolactone. The extractions with the lactone can be carried out at temperatures ranging from room temperature to about 100° C. for periods of time ranging from about one hour to about ten hours.

The details and comparative advantages of the process of this invention may be clearly understood from consideration of the following examples in which the best mode of carrying out the invention is set forth.

Example I

A 3-neck 500 ml. flask, equipped with stirring equipment, nitrogen inlet and drying tube, was fitted with a Dry Ice bath capable of cooling the reaction flask to —30° C. To this flask, 126 grams of gamma-butyrolactone, 14.7 grams of m-phenylene diamine, and 39.0 grams of 2,6-lutidine were added. While stirring, 27.7 grams of phthaloyl chloride, as a mixture of 70% iso- and 30% terephthaloyl chlorides were added. The temperature was maintained at about 0° C. Upon complete addition of the phthaloyl chlorides, the reaction mixture became extremely viscous and additional solvent was added. The resultant polyamide was then precipitated by addition to a Waring Blendor containing three parts of water to one part of polymer solution. The polymer was washed three times until neutral and then vacuum dried overnight at 100° C.

The inherent viscosity of the polymer, measured in 95% $H_2SO_4$, was 2.3 dl./g. Films were cast of this polyamide from dimethyl acetamide and the polymer properties, as well as $T_g$ values of the film are listed in the accompanying table.

| Ex. No. | Iso-/tere- ratio | Acid acceptor | | | Properties | |
|---|---|---|---|---|---|---|
| | | Name | Solubility in butyr- olactone | pKa | $T_g$, °C. | I.V., dl./g. |
| 1 | 70/30 | 2,6-lutidine | Miscible | 6.5 | 257 | 2.3 |
| 2 | 70/30 | ...do... | ...do... | 6.5 | 257 | 3.9 |
| 3 | 100/0 | ...do... | ...do... | 6.5 | 268 | 2.0 |
| 4 | 50/50 | Pyridine | ...do... | 5.2 | 257 | 0.9 |
| 5 | 30/70 | Triethylamine | Insoluble | 10 | 278 | 0.4 |
| 6 | 70/30 | MgO | ...do... | 15 | | <0.1 |

Example II

The polymerization of Example I was repeated except that twice as much butyrolactone was used initially. The results are in the table.

Example III

Example I was repeated with 100% isophthaloyl chloride and 0% terephthaloyl chloride. The results are in the table.

Example IV

The procedure of Example I was carried out with a 50/50 ratio of diacid chloride and 2.5 moles of pyridine, added initially, for each mol of the diacid chloride. The aromatic base was completely miscible with the gamma-butyrolactone. Almost immediately upon addition of the mixture of iso- and terephthaloyl chloride, a precipitate formed in the polymerization flask. It increased during the addition of diacid chloride and persisted until near the end of the reaction when the slurry was heated to about 50° C.

Because metaphenylene diamine is merely 0.4 pKa less basic than pyridine, it was able to compete with the pyridine for the HCl liberated during the reaction, resulting in a copious precipitation of m-phenylene diamine hydrochloride.

After disappearance of the precipitate, the reaction solution became viscous. The polyamide was then precipitated, washed, and dried as in Example I. The inherent viscosity of the polyamide thus obtained was determined in 95% $H_2SO_4$ at 25° C. and at 0.5 weight percent polymer. The $T_g$ of cast films of this material was determined on the differential scanning calorimeter. The data are in the table.

Example V

A 50/50 mixture of iso-/terephthaloyl chloride was distilled and used as in Example I was triethylamine as the acid acceptor. A precipitate of polymer plus triethylamine hydrochloride formed early in the polymerization, and stirring and temperature control were very difficult. Finally, after work-up water precipitation, washing, and drying, an all-aromatic polyamide was obtained with an I.V. of 0.4 dl./g. and a $T_g$ of 278° C., as shown in the table.

Example VI

A polymerization was carried out essentially as described in Example I except that 1.1 mols of MgO were added for each mol of diacid chloride. No exotherm nor thickening were noted during the course of the reaction. After precipitation, washing, and drying as in Example I, as brown powder was obtained with an I.V. less than 0.1 dl./g.

It was apparent that essentially no reaction occurred in the MgO example and that an insolubilizing effect occurred in the triethylamine example. Both MgO and triethylamine are insoluble in butyrolactone, as shown in the table, but MgO is so completely insoluble that it is completely unable to trap hydrochloric acid generated in the polymerization as it is being formed. The triethylamine has sufficient solubility to do so, but the triethylamine hydrochloride salt immediately dropped out so that it was unable to solubilize the aromatic polyamide in the same manner as 2,6-lutidine does.

Example VII

This example will illustrate the most preferred embodiments of this invention in that a 70/30 mixture of meta/para phenylene diamine and 100% isophthaloyl chloride are employed.

An 18 liter five neck resin kettle was equipped with the following services:

(a) a sized double spiral agitator driven by a heavy duty drill;
(b) thermometer;
(c) nitrogen inlet;
(d) drying tube-nitrogen outlet; and
(e) dropping tube containing 1700 grams of molten isophthaloyl chloride.

To the resin kettle were added 633.8 grams distilled meta phenylene diamine, 271.6 grams para phenylene diamine, 1,881.5 grams, 2,6-lutidine undistilled and 10,255 grams distilled gamma-butyrolactone. The mixture was stirred under nitrogen at room temperature for about 20 minutes to dissolve the para phenylene diamine. The molten isophthaloyl chloride was then added over one-half hour while the reaction mixture was maintained at 30° C. by the application of a Dry Ice-gamma-butyrolactone bath at −40° C. At this point the viscous reaction mixture is stirred for an additional 20–30 minutes. The thick solution is poured in portions into water, vigorously stirred in a Waring Blendor to precipitate the 70/30 polyamide. The white fibrous polymer was washed several times with water in a Waring Blendor, finally rinsed with acetone to facilitate drying and dried in a vacuum oven at 100-120° C. The inherent viscosity of this aromatic polyamide determined in 0.5 wt. percent solution in 95% $H_2SO_4$ at 25° C. is 1.79 dl./g. Recovered yields of 70/30 polyamide preparations in gamma-butyrolactone - 2,6 lutidine are typically 95% of theoretical.

The polyamide prepared in the above manner was then cast into films whose properties were evaluated at 220° C. The solvents used to cast the films as well as the results of said evaluation are shown in the following table.

TABLE

| | A | B | C | D | E |
|---|---|---|---|---|---|
| Tensile strength, p.s.i | 2,500 | 8,400 | 8,900 | 9,100 | 9,800 |
| Tensile elongation, percent | 230 | 41 | 35 | 50 | 71 |
| Tensile modulus, p.s.i.×10³ | 89 | 345 | 403 | 383 | 477 |

NOTE.—A=Cast from dimethyl acetamide; B=Cast from dimethyl formamide; C=Cast from dimethyl formamide and heated at 220° C. for 48 hours; D=Cast from dimethyl formamide and extracted for 4 hours at room temperature with gamma-butyrolactone; E=Cast from dimethyl formamide and heated at 85° C. for one hour.

The invention should not be limited to the specific exemplary information given hereinbefore, for various modifications can be made without departing from the spirit of the invention which can be understood as being limited only by the scope of the accompanying claims.

What is claimed is:

1. In a process for preparing a high molecular weight wholly-aromatic polyamide by reacting, in the presence of a solvent system and an amine which acts as an acid acceptor, aromatic diamines and aromatic diacid halides, the improvement which comprises conducting said reaction in the presence of a mutual solvent system comprising anhydrous gamma-butyrolactone and said acid acceptor wherein the acid acceptor, which is free from any active hydrogens, and the gamma-butyrolactone are miscible with each other.

2. The improvement of claim 1 in which said acid acceptor has a pKa at least 0.5 units greater than the pKa of said aromatic diamines.

3. The improvement of claim 2 in which said acid acceptor is 2,6-lutidine.

4. The improvement of claim 1 in which said aromatic diamines comprise meta-phenylene diamine and para-phenylene diamine.

5. The improvement of claim 4 in which said aromatic diacid halides comprise isophthaloyl chloride and terephthaloyl chloride.

6. The improvement of claim 5 in which meta-phenylene diamine is 70 percent by weight and para-phenylene diamine is 30 percent by weight of said aromatic diamine.

7. In a process for preparing a high molecular weight wholly-aromatic polyamide by reacting, in the presence of a solvent system and an amine which acts as an acid acceptor, aromatic diamines and aromatic diacid halides, the improvement which comprises reacting isophthaloyl chloride with a mixture of 70 percent by weight of a meta-phenylene diamine and 30 percent by weight of a para-phenylene diamine in the presence of a mutual solvent system comprising anhydrous gamma-butyrolactone and an acid acceptor comprising 2,6-lutidine.

References Cited

UNITED STATES PATENTS

| | | | |
|---|---|---|---|
| 2,958,677 | 11/1960 | Kleinschmidt | 260—78 |
| 3,063,966 | 11/1962 | Kwolek et al. | 260—78 |

HAROLD D. ANDERSON, Primary Examiner

U.S. Cl. X.R.

260—30.4 N, 47 CZ